United States Patent [19]

Amick

[11] 3,987,982
[45] Oct. 26, 1976

[54] WIND-POWERED FLYING BOAT

[76] Inventor: James L. Amick, 1464 Cedar Bend Drive, Ann Arbor, Mich. 48105

[22] Filed: Jan. 26, 1976

[21] Appl. No.: 652,386

Related U.S. Application Data

[63] Continuation of Ser. No. 530,415, Dec. 6, 1974, abandoned.

[52] U.S. Cl. .................... 244/16; 244/44; 244/105; 114/39
[51] Int. Cl.² ................ B64C 31/02; B64C 35/00
[58] Field of Search ............ 244/13, 16, 105, 106, 244/123, 44, DIG. 1, 47; 114/39, 43, 66.5 R, 66.5 H, 66.5 S, 102, 123, 126; D12/71, 75

[56] References Cited

UNITED STATES PATENTS

| | | | |
|---|---|---|---|
| 1,400,262 | 12/1921 | Caproni | 244/105 |
| 2,255,046 | 9/1941 | Diehl | 244/106 |
| 3,077,173 | 2/1963 | Lang | 114/66.5 H |
| 3,208,421 | 9/1965 | Landes et al. | 114/66.5 S |
| 3,332,383 | 7/1967 | Wright | 244/44 |
| 3,584,813 | 6/1971 | Sweeney et al. | 244/123 X |
| 3,599,903 | 8/1971 | Handler | 244/105 |
| 3,800,724 | 4/1974 | Tracy | 114/39 |
| 3,911,845 | 10/1975 | Holtom | 114/39 |

FOREIGN PATENTS OR APPLICATIONS

| | | | |
|---|---|---|---|
| 717,054 | 10/1931 | France | 244/106 |
| 356,209 | 8/1919 | Germany | 114/39 |
| 378,778 | 8/1923 | Germany | 244/44 |

Primary Examiner—Trygve M. Blix
Assistant Examiner—Galen L. Barefoot
Attorney, Agent, or Firm—Olsen and Stephenson

[57] ABSTRACT

A water-based sailing vehicle that is able to accelerate from rest under wind power, become airborne, and fly above the water. At low speeds, the vehicle performs as a displacement sailboat. At higher speeds, the weight of the vehicle is supported by a combination of hydrodynamic lift from the planing hull and aerodynamic lift from the wings, or by aerodynamic lift alone. The wings are set at a large dihedral angle, so that with one wing-tip float immersed, the horizontal wing provides a lifting force, while the raised wing provides a horizontal side force for sailing, plus some additional lift. The wings and tail have airplane-type control surfaces which give complete control both in the sailing mode and in free flight.

8 Claims, 6 Drawing Figures

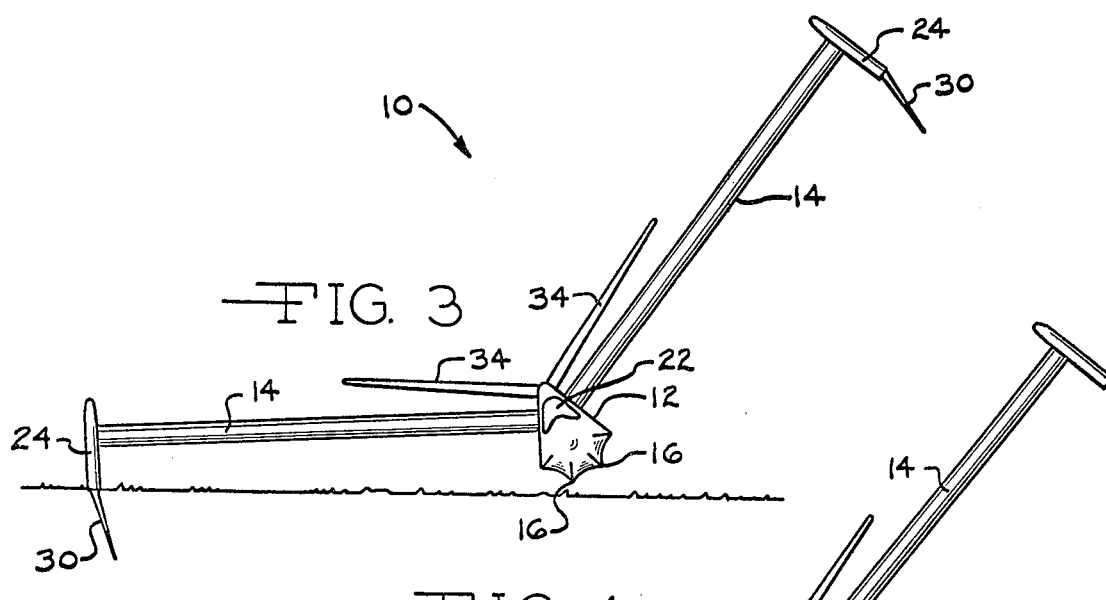
FIG. 3
FIG. 4
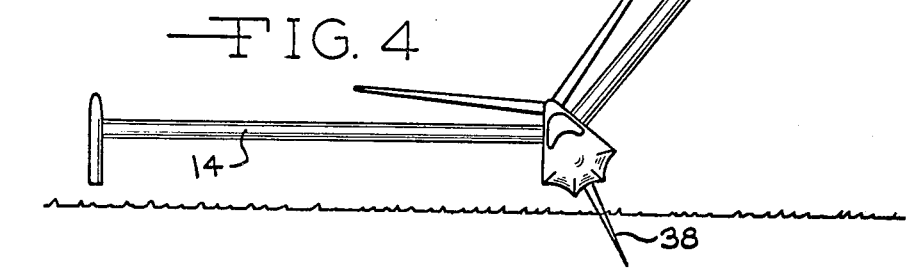
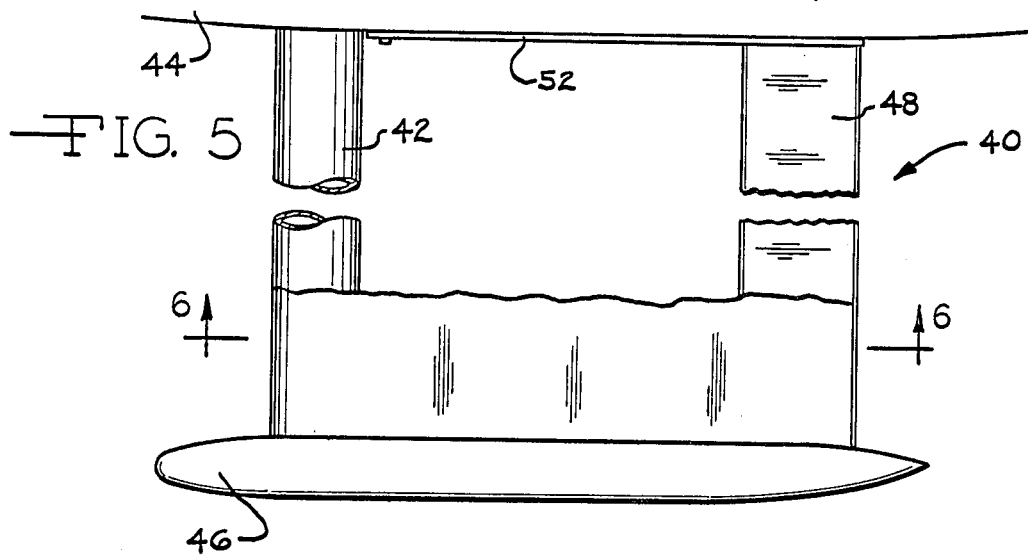
FIG. 5
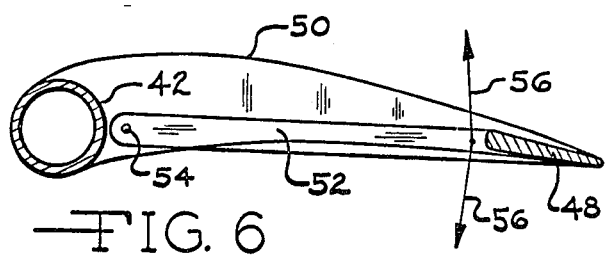
FIG. 6

WIND-POWERED FLYING BOAT

REFERENCE TO PENDING APPLICATION

This application is a continuation of pending application Ser. No. 530,415, filed Dec. 6, 1974 in the name of James L. Amick for "Wind-Powered Flying Boat", now abandoned.

REFERENCE TO RELATED APPLICATION

This application relates to my pending application Ser. No. 455,043, filed Mar. 27, 1974, entitled "Wind Launched Sailplane", now U.S. Pat. No. 3,899,146.

BACKGROUND OF THE INVENTION

The present invention relates to a vehicle adapted for both sailing on water and free flight. The invention is related to sailboats and airplanes, combining features of both types of vehicles with other new features into a vehicle having unique capabilities.

A traditional sailboat has a low level of aerodynamic efficiency, that is, the aerodynamic drag force is a relatively large fraction of the side force developed by the sail. The excess drag is partly induced drag due to tip losses at the top and bottom of the sail, and partly parasite drag due to turbulent flow past the unstreamlined hull and crew. In addition, a typical sailboat has poor hydrodynamic efficiency because of the large drag associated with moving a heavy object through water at a high speed. Consequently, maximum speeds of sailboats are relatively low (less than 35 mph).

By redesigning a sailboat with airplane-like parts, arranged to give a side force, a great improvement in aerodynamic efficiency can be achieved. At the same time, by using aerodynamic lift to support a large part of the vehicle weight, the hydrodynamic drag can be greatly reduced. The result is a vehicle that sails much faster than a conventional sailboat, and has the added capability of performing as an airplane in free flight.

SUMMARY OF THE INVENTION

The present invention improves on the poor aerodynamic efficiency of traditional sailboats by replacing the sail with a wing whose tip losses are diminished by means of a long span and by tip floats that act as endplates, and by replacing the hull with a steamlined fuselage with enclosed cockpit. Overall efficiency is also improved by supporting the vehicle weight aerodynamically instead of hydrodynamically.

In one form, the invention consists of a streamlined fuselage on which wings with ailerons and tip floats are mounted at a large dihedral angle. A hydrofoil projects downward from each wing-tip float. At the aft end of the fuselage a V-tail performs the functions of rudder and elevator. The bottom of the fuselage is contoured with steps and chines like a typical flying boat in order to minimize hydrodynamic drag at high speeds. The pilot sits in an enclosed cockpit operating airplane-like rudder, elevator, and aileron controls.

In the sailing mode, one wing is aproximately horizontal while the other wing is substantially raised. The float at the tip of the horizontal wing skims the surface of the water with its hydrofoil immersed, providing a hydrodynamic side force to counteract the aerodynamic side force developed by the raised wing. Tacking is accomplished by deflecting the tail surfaces to produce a positive angle of attack on the horizontal wing and a negative angle of attack on the raised wing. The resulting unbalanced moment rolls the craft until the formerly raised wing becomes horizontal. The ailerons can be used to aid this rolling maneuver.

For free flight, the vehicle must first be sailed to a speed in excess of the minimum takeoff speed. At this speed, most of the vehicle weight is airborne, with only the tip float and hydrofoil of the horizontal wing in contact with the water. Premature takeoff is avoided by keeping the tail high (using the elevator control) so that the angle of attack of the horizontal wing is small. To take off, the tail is lowered, increasing the lift on the horizontal wing and raising its tip float and hydrofoil out of the water. The craft is then flying free as an airplane and can climb above the water surface until its airspeed diminishes to some value near the stall speed. As an example, if takeoff occurs at a speed of 48 knots and the stalling speed is 24 knots, then the maximum altitude would be 75 feet, and an assumed lift-to-drag ratio of 16 would permit a free flight distance of 1,200 feet.

Accordingly, it is an object of the present invention to provide a wind-powered flying boat which is constructed and arranged to have better efficiency than present sailboats, thus allowing a higher maximum speed and a free flight capability.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 3 is a front elevational view of the flying boat, traveling at high speed;

FIG. 4 is a front elevational view of another embodiment of the present invention showing an alternative hydrofoil arrangement;

FIG. 5 is a fragmentary top plan view of an alternative wing construction that can be used in the present invention; and, FIG. 6 is a sectional view taken on the lines 6—6 of FIG. 5.

Figure 1:
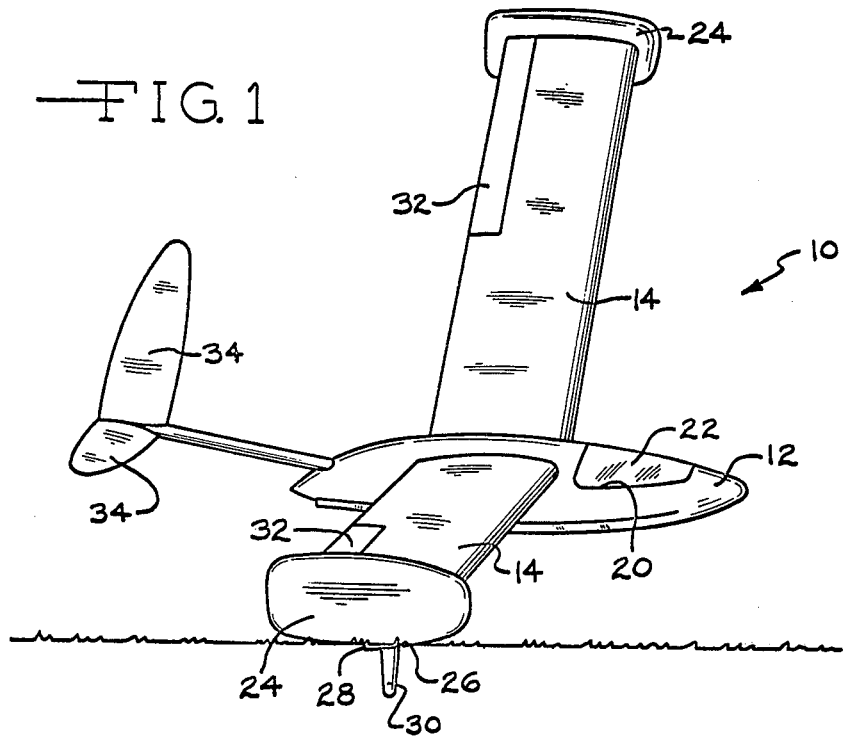
FIG. 1 is a perspective view of a wind-powered flying boat embodying the present invention showing the starboard side of the boat in the high speed sailing condition.

DESCRIPTION OF THE PREFERRED EMBODIMENT.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The wind-powered flying boat 10 has a streamlined fuselage 12. As shown in FIG. 3 the fuselage cross section is designed so that with either wing 14 horizontal the bottom part has a broad V-shape 16 typical of flying boat hulls. Steps 18 along the bottom (FIG. 2) help minimize water resistance as in a conventional seaplane.

Figure 2:
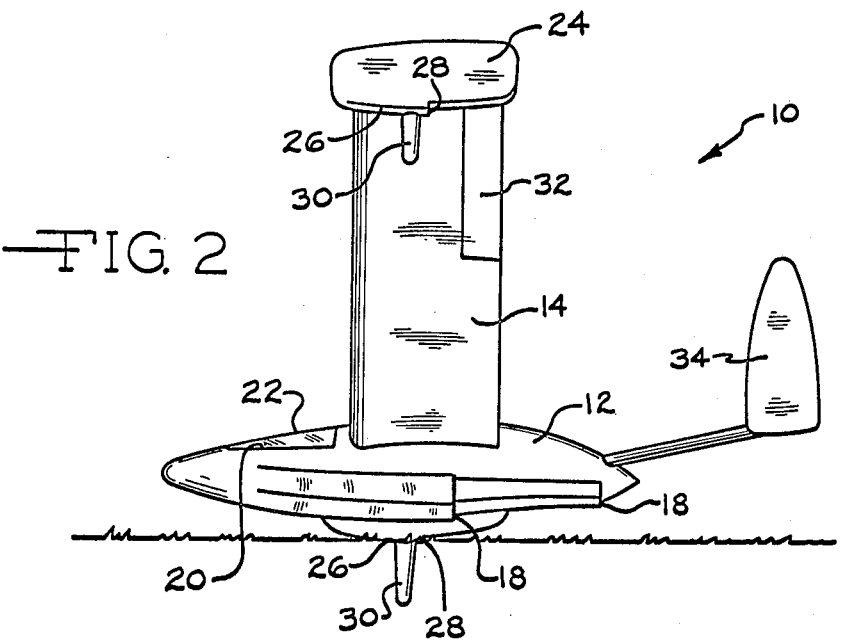
FIG. 2 is a side elevational view showing the port side of the flying boat, traveling at high speed.

The cockpit 20 is covered by a transparent canopy 22 to shield and streamline the pilot. Wings 14 having cambered airfoil sections are attached to the fuselage at about a 25° dihedral angle (angle between wing and plane perpendicular to the plane of symmetry). Wing-tip floats 24 support the outer ends of the wings 14 above waves. The bottom of each float 24 has a forward planing surface 26 terminating in a step 28, for efficient skimming along the surface of the water (FIG. 2). Immediately forward of the steps 28 hydrofoils 30 are mounted. Each hydrofoil is inclined so that the side force it develops is directed through the center of gravity of the flying boat 10, to balance lateral moments. Since each hydrofoil 30 must provide forces in one direction only, cambered airfoil sections are provided for greater efficiency.

The wings 14 have trailing edge ailerons 23 for roll control. Further control is afforded by the V-arranged all-movable tail surfaces 34 mounted on the boom 36 which is an extension from fuselage 12. Aileron, elevator, and rudder control surfaces are manipulated by the pilot through conventional arrangements (not shown) of cable and/or linkages extending to the cockpit 20. The sides of the cockpit 20 are padded (not shown) so that the pilot can be comfortable while tilted to the side 25° from the vertical.

After the fuselage 12 has become airborne as depicted in FIGS. 1–3, further increases in speed are possible by reducing the angle of attack of the horizontal wing 14 while increasing the side force produced by the raised wing. When a sufficient margin of speed over the stall speed has been obtained, the flying boat 10 may climb above the water surface in free flight, exchanging excess speed for altitude.

An alternative hydrofoil location is shown in FIG. 4. Here a symmetrical central hydrofoil 38 replaces the two tip foils 30 previously shown. With this arrangement the hydrofoil 38 can be retracted for operation in shallow water or for beaching. However, since the hydrofoil side force does not act through the center of gravity in this case, balancing the rolling movements might be more difficult.

In place of a standard rigid wing 14 as shown in FIGS. 1–4, the stretched membrane wing 40 shown in FIGS. 5 and 6 can be used. This wing 40 is based on a leading edge tube 42 rigidly mounted to the fuselage 44 and the wing-tip float 46. A trailing edge slab 48 is positioned at a uniform distance behind the leading edge, and the airfoil contour is formed by a sleeve of sailcloth 50 stretched between the leading edge tube 42 and the trailing edge slab 48. The trailing edge slab 48 is positioned by an arm 52 rigidly attached to each end of the slab 48, and pivoted at a point 54 just behind the leading edge tube 42. The vertical positioning of each end of the trailing edge is controlled by cables 56 which are routed over pulleys (not shown) to the cockpit 20 where they are connected to the aileron control means (not shown). When the aileron control means is moved to give a rolling moment to the right, the cables 56 move the right end of each trailing edge up, and the left end down. In this manner a rolling moment to the right is obtained without altering the total lift on each wing.

An auxiliary lever (not shown) for each wing causes the cables 56 to move both ends of the trailing edge up or down simultaneously, thus changing the lift on that wing. This feature is especially useful for adjusting the angle of attack of the raised wing without changing the vehicle heading — a capability that makes for easier starting up from rest.

Other dihedral angles within the range of 10° to 45° may be used for this invention. The larger angles give increased sailing efficiency, while the smaller angles give better flying. A T-tail may also be substituted for the V-tail shown.

It is claimed:

1. A wind-powered flying boat comprising a fuselage with wings fixedly mounted thereon at a dihedral angle within the range of 10° to 45°, said fuselage defining a hull member for traveling on a surface of water, float members fixedly mounted on the outer tips of said wings in positions so that either wing will assume approximately a horizontal position when its associated float member and said hull member are immersed in bouyant positions in said water, and a hydrofoil fixedly mounted on each of the float members and projecting downward to develop a horizontal side force in opposition to the component of boat motion in the leeward direction when the boat is traveling in or skimming along the surface of said water, each said hydrofoil having its tip inclined inward from the vertical line through its root when its associated wing is horizontal at an angle sufficient so as to reduce the moment arm with respect to the center of gravity of the boat of the side force that the hydrofoil produces, the bottom of each of said members having a forward planing surface terminating in a step for efficient skimming along the surface of the water.

2. The wind-powered flying boat that is defined in claim 1, wherein each said hydrofoil is mounted immediately forward of its associated step.

3. The wind-powered flying boat that is defined in claim 1, wherein the bottom of said hull member has two symmetrically arranged V-shaped planing surfaces, one planing surface being operable to travel in or skim along the surface of the water when one wing is in a horizontal position and the other planing surface being operable to travel in or skim along the surface of the water when the other wing is in a horizontal position.

4. The wind-powered flying boat that is defined in claim 1, wherein said fuselage is streamlined and includes a transparent canopy for enclosing a cockpit.

5. The wind-powered flying boat that is defined in claim 1, wherein a boom extends rearward from said fuselage, and means providing tail surfaces is mounted on the after end of said boom.

6. The wind-powered flying boat that is defined in claim 1, wherein said wings are rigid and have trailing edge ailerons.

7. The wind-powered flying boat that is defined in claim 1, wherein each said hydrofoil has cambered cross sections to enhance the efficiency of generation of said side force.

8. A wind-powered flying boat comprising a fuselage with wings mounted thereon at a fixed dihedral angle within the range of 10° to 45°, each of said wings having a fixed leading edge, a rigid but movable trailing edge, and a flexible membrane stretched around said leading and trailing edges, said fuselage defining a hull member for traveling on a surface of water, float members mounted on the other tips of said wings in positions so that either wing will assume approximately a horizontal position when its associated float member and said hull member are immersed in bouyant positions in said water, and a hydrofoil mounted on one of the members that are immersed in said water and projecting downward to develop a horizontal side force in opposition to the component of boat motion in the leeward direction when the boat is traveling in or skimming along the surface of said water, the bottom of each of said members having a forward planing surface terminating in a step for efficient skimming along the surface of the water.

* * * * *